(12) United States Patent
Kennedy

(10) Patent No.: US 10,612,218 B2
(45) Date of Patent: Apr. 7, 2020

(54) FIRE HYDRANT, FIRE HYDRANT STEM, AND FIRE HYDRANT UPPER STEM ASSEMBLY

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

(21) Appl. No.: 16/106,897

(22) Filed: Aug. 21, 2018

(65) Prior Publication Data

US 2020/0063403 A1 Feb. 27, 2020

(51) Int. Cl.
  *E03B 9/04* (2006.01)
  *F16K 31/50* (2006.01)
  *F16K 35/06* (2006.01)

(52) U.S. Cl.
  CPC ............... *E03B 9/04* (2013.01); *F16K 31/50* (2013.01); *F16K 35/06* (2013.01)

(58) Field of Classification Search
  CPC ... E03B 9/04; E03B 9/02; E03B 9/025; E03B 2009/022; F16K 31/50; F16K 35/06
  See application file for complete search history.

(56) References Cited

U.S. PATENT DOCUMENTS

| | | | | |
|---|---|---|---|---|
| 3,711,063 A | * | 1/1973 | Gibbs et al. | F16K 31/50 251/276 |
| 4,209,033 A | * | 6/1980 | Hirsch et al. | E03B 7/12 137/218 |
| 6,769,446 B1 | * | 8/2004 | Ball et al. | E03B 7/10 137/301 |
| 2013/0206241 A1 | * | 8/2013 | Fleury, Jr. et al. | E03B 9/02 137/1 |

* cited by examiner

*Primary Examiner* — Kevin L Lee
(74) *Attorney, Agent, or Firm* — Brown & Michaels, PC

(57) ABSTRACT

A fire hydrant stem includes a shaft having a center axis, a first end portion, a first end, and a second end. The first end portion extends axially a length from the first end, has external threads, and defines an internal cavity open through the first end. The second end is configured to engage a fire hydrant main valve operating assembly. A fire hydrant upper stem assembly includes a fire hydrant stem and a spring element. The fire hydrant stem defines an internal cavity, and the spring element is in the internal cavity.

22 Claims, 5 Drawing Sheets

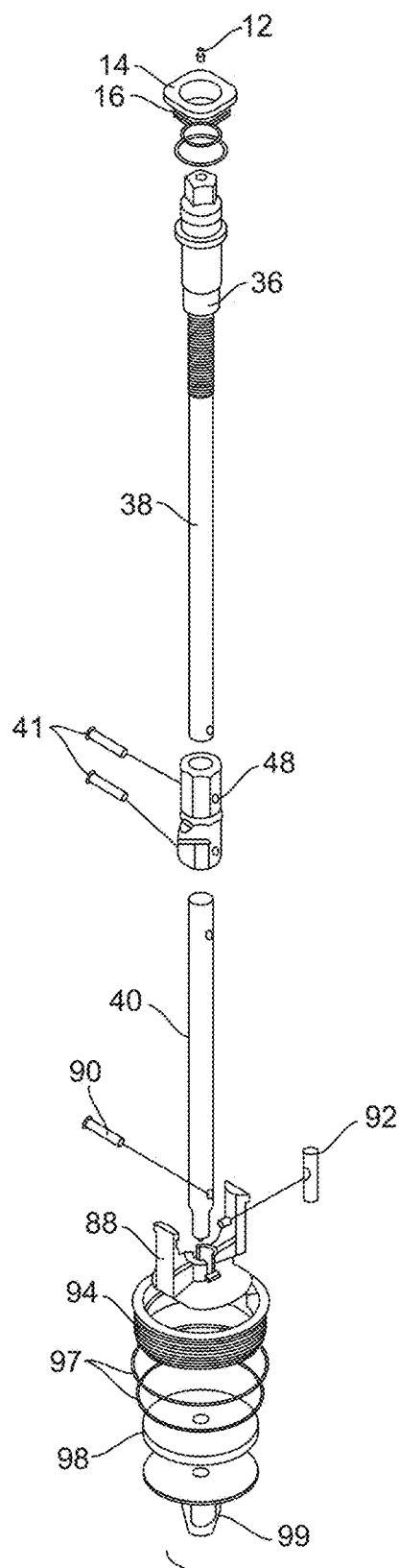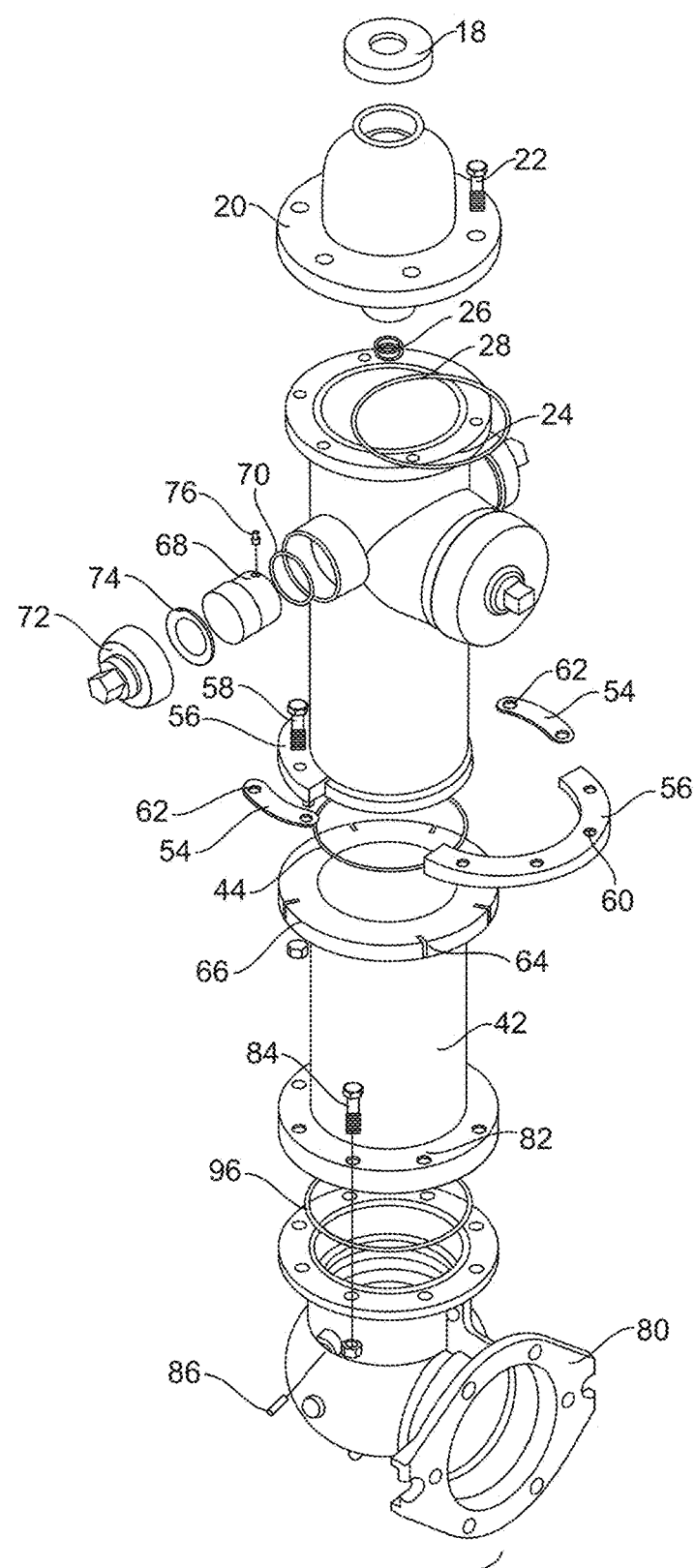
Prior Art
FIG. 1
Prior Art
FIG. 2

FIRE HYDRANT, FIRE HYDRANT STEM, AND FIRE HYDRANT UPPER STEM ASSEMBLY

BACKGROUND OF THE INVENTION

Field of the Invention

The invention pertains to the field of fire hydrants. More particularly, the invention pertains to a cap and main valve operating assembly of a dry barrel fire hydrant.

Description of Related Art

In a dry-barrel fire hydrant, an above-ground portion of the hydrant is separated from a pressurized water source by a main valve in a lower barrel or elbow of the hydrant below ground. The upper barrel remains dry until the main valve is opened by means of a long stem that extends from the main valve, through the upper barrel, to the top, or bonnet, of the hydrant.

FIGS. 1, 2, and 3 show a prior art fire hydrant 10. FIG. 1 illustrates internal components, FIG. 2 illustrates external components, and FIG. 3 shows a cross section of the assembled hydrant, including the internal and external components of FIG. 1 and FIG. 2. The fire hydrant 10 includes a grease fitting 12 and a fastener 14, 16 such as an Allen head set screw 14 and a nut 16. A dirt shield 18 fits onto a hydrant cap 20. Cap fasteners 22, such as bolts and nuts, fasten the hydrant cap 20 to an upper barrel 24. The hydrant 10 also includes an O-ring 26 and a hydrant cap gasket 28. A washer 30, for example a thrust washer, facilitates the connections in the cap portion of the fire hydrant. O-rings 32, 34 seal various portions of the fire hydrant 10.

An operating stem nut 36 connects an upper stem 38 to the cap portions of the fire hydrant 10. The upper stem 38 is located in the center of the upper barrel 24 and a lower stem 40 is located in the center of the lower barrel 42. An O-ring 44 creates a seal between the upper barrel 24 and the lower barrel 42. A stem ferrule, ring or cap 46 is preferably located on an upper end of the upper stem 38. A stem coupling assembly 48 connects between the upper stem 38 and the lower stem 40, held to each by coupling pins 41. The stem coupling assembly 48 is preferably located directly above the ground line 50. FIG. 3 shows a distance 52 between the stem coupling assembly 48 and the ground line 50. In some fire hydrants, this distance 52 is approximately three inches.

In some embodiments, a barrel coupling includes two breaker straps 54 and two breaker rings 56. Each breaker strap 54 connects to the ends of the two breaker rings 56 to keep the breaker rings 56 in place. A bolt or other fastener 58 goes through holes 60 in the breaker ring 56, through holes 62 in the breaker strap 54, and into a hole 64 in a flange 66 of the lower barrel 42. The breaker straps 54 pick up the outer holes 22 in each side of the two half moon breaker rings 56.

A hose connects to the fire hydrant 10 at a nozzle assembly 67, which includes a nozzle 68, an O-ring 70, a nozzle cap 72, a nozzle cap gasket 74, and a nozzle retaining screw 76. The nozzle 68 also can include a nozzle cap chain 78 and a nozzle chain hook 79, for example an S-hook, which connects one end of the chain 78 to the body of the fire hydrant 10.

An elbow 80 includes a seal 82 and fasteners 84. The fire hydrant 10 also includes a drain tube 86. A drain valve 88 includes a drain valve pin 90, and a drain valve facing with inserts 92. A seat ring 94 includes a seat ring insert 96. Seals, such as O-rings 97, seal the seat ring 94 to the main valve 98. A bottom plate 99 sits within the elbow 80. In FIG. 3, the drain hole in the drain tube 86 is shown rotated 90 degrees. The elbow (shoe) 80 and the bottom plate 99 are preferably epoxy coated in accordance with regulations.

The upper and lower stems 38, 40, and the main valve 98 attached to the lower stem 40, are moved by rotating the operating stem nut 36, which is secured from moving axially or linearly by the fastener 14, 16. Because the operating stem nut 36 accordingly rotates without moving axially or linearly, and the operating stem nut 36 has threads engaged with threads of the upper stem 38, rotating the operating stem nut 36, moves the upper and lower stems 38, 40 axially or linearly to open or close the main valve 98. When the main valve 98 is in the closed position, water pressure against the main valve 98 biases the main valve 98 to stay in the closed position, which can increase the torque necessary to be exerted on the operating stem nut 36 to open the main valve 98.

SUMMARY OF THE INVENTION

According to an embodiment, a fire hydrant stem includes a shaft having a center axis, a first end portion, a first end, and a second end, the first end portion extending axially a length from the first end, the first end portion having external threads and defining an internal cavity open through the first end, the second end configured to engage a fire hydrant main valve operating assembly.

According to another embodiment, a fire hydrant upper stem assembly includes a fire hydrant stem defining an internal cavity; and a spring element in the internal cavity.

According to another embodiment, a fire hydrant includes an upper barrel defining a hollow and having a center axis; a stem in the hollow of the upper barrel, the stem having an upper end and a lower end, the upper end defining a cavity; a main valve coupled to the lower end of the stem, the stem configured to be moved along the center axis to move the main valve between an open position allowing fluid into the fire hydrant and a closed position preventing fluid from entering the fire hydrant; and a spring element in the cavity of the stem, the spring element coupled to the upper barrel, the spring element configured to bias the stem in a direction from the upper end of the stem toward the main valve.

BRIEF DESCRIPTION OF THE DRAWINGS

FIG. 1 shows a stem and valve assembly of a prior art fire hydrant.

FIG. 2 shows a barrel assembly of the fire hydrant of FIG. 1.

DETAILED DESCRIPTION OF THE INVENTION

Figure 3:
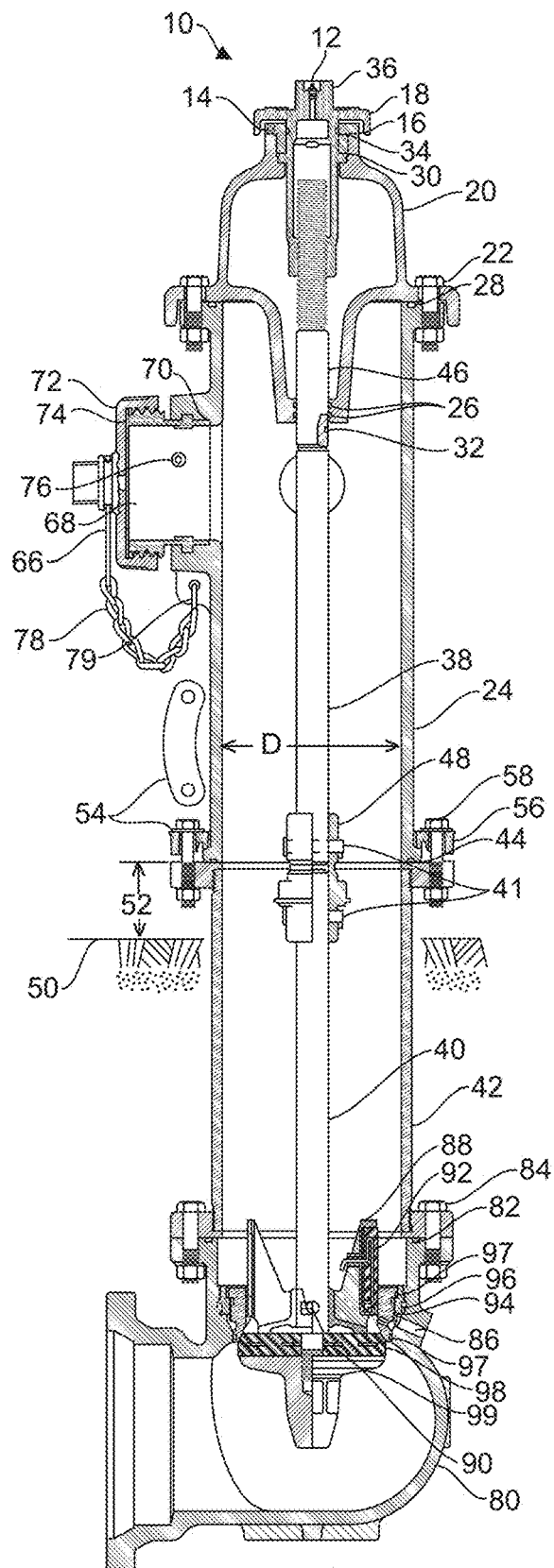
FIG. 3 shows a cross-sectional side view of the fire hydrant of FIGS. 1 and 2.
Figure 4:
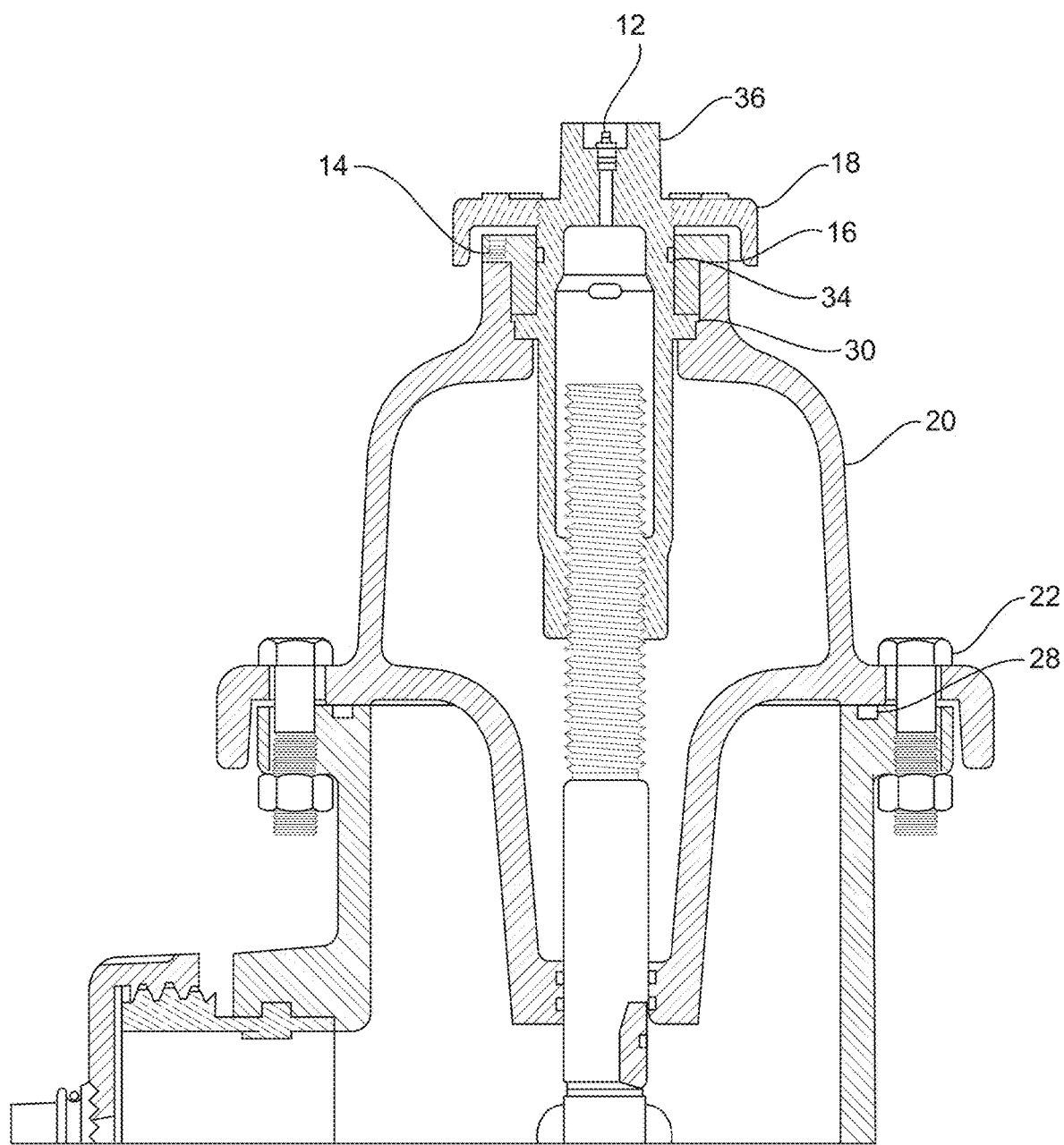
FIG. 4 shows a detailed cross-sectional side view of a upper stem assembly of the fire hydrant of FIGS. 1-3.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "axial" and/or "axially" refer to the relative position/direction of objects along an axis substantially parallel with a center axis of the fire hydrant or other component specified. As further used herein, the terms "radial" and/or "radially" refer to the relative position/direction of objects along an axis substantially perpendicular with the center axis. Additionally, the terms "circumferential" and/or "circumferentially" refer to the relative position/direction of objects along a circumference surrounding the center axis.

Figure 5:
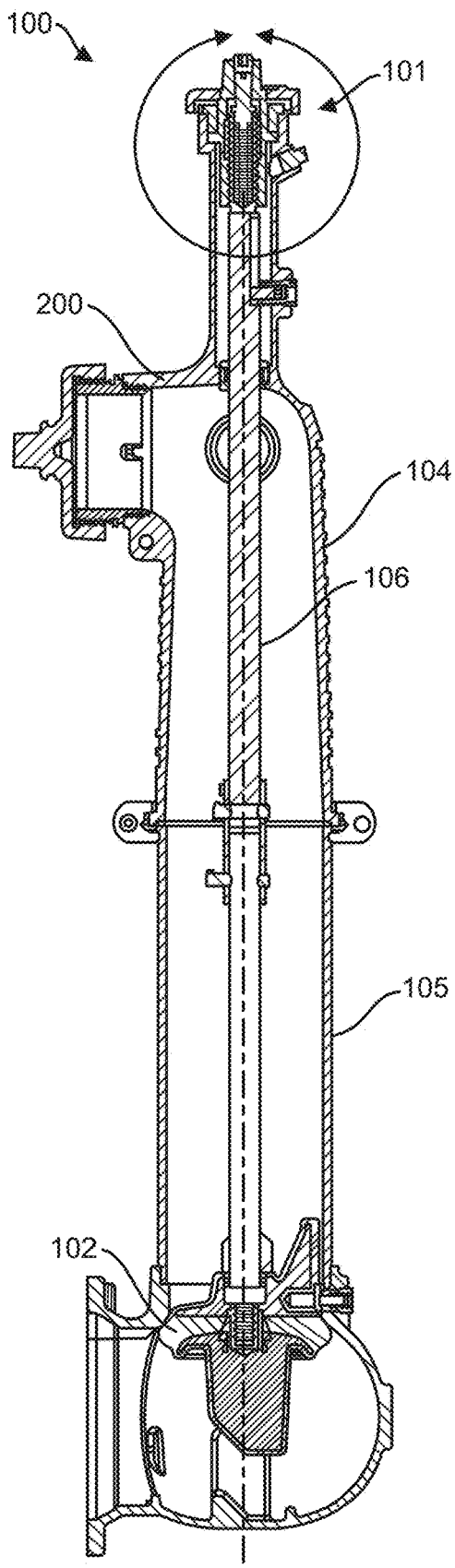
FIG. 5 shows a cross-sectional side view of a fire hydrant, according to an embodiment of the invention.

FIG. 5 shows a cross-sectional side view of a fire hydrant 100 according to an example embodiment. The fire hydrant 100 according to this example embodiment includes an upper stem assembly 101 and a main valve 102. The upper stem assembly 101 is at an upper end of an upper barrel 104 and the main valve 102 is at a lower end of a lower barrel 105. A stem 106 extends as a shaft between the main valve 102 and the upper stem assembly 101.

Figure 6:
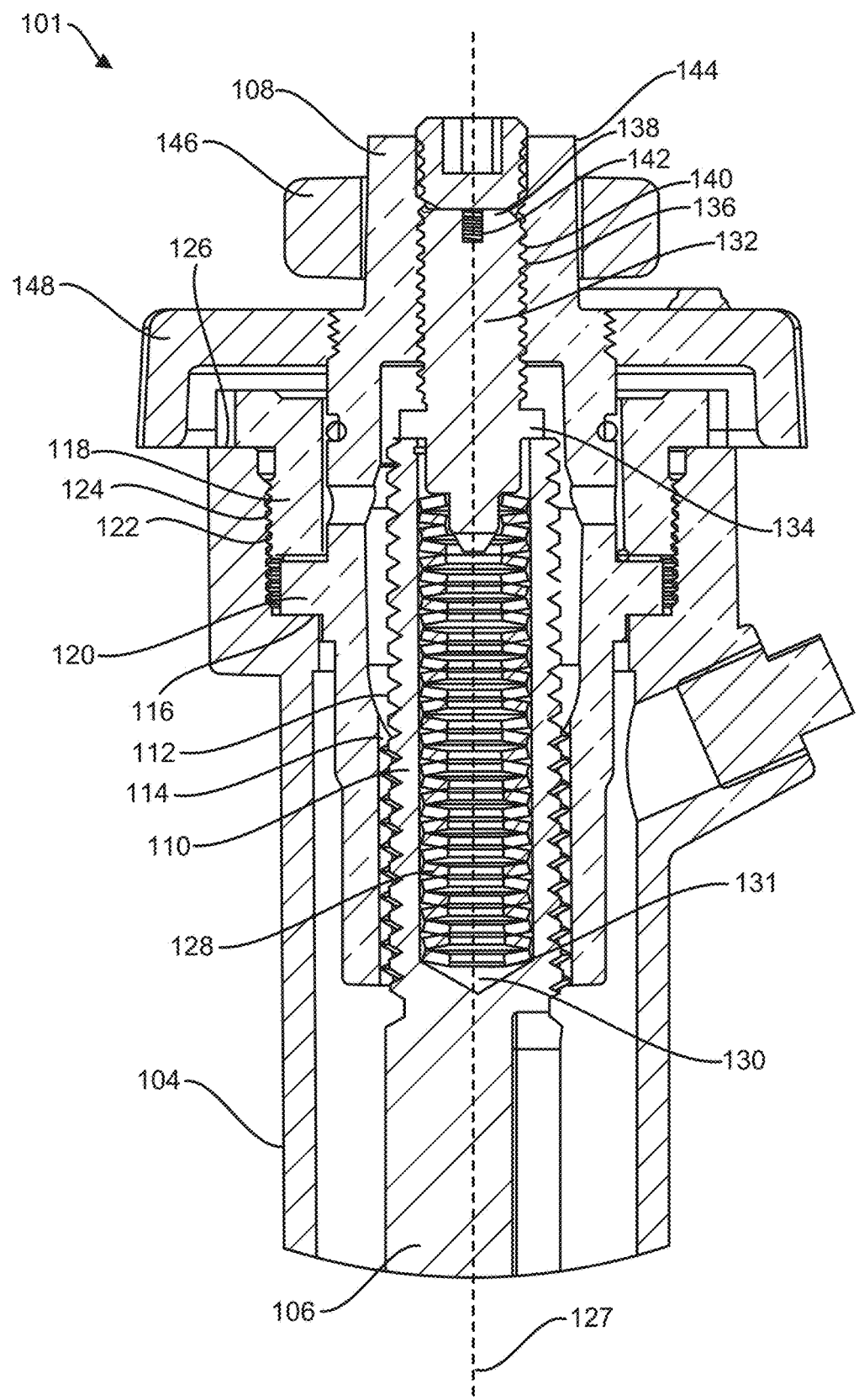
FIG. 6 shows a detailed cross-sectional side view of a upper stem assembly of the fire hydrant of FIG. 5.

FIG. 6 shows a detailed cross-sectional side view of the upper stem assembly 101 of the fire hydrant 100. The upper stem assembly 101 includes an operating stem nut 108 to actuate (i.e., move axially, or raise or lower) the stem 106 and thereby open or close the main valve 102 (see FIG. 5) of the fire hydrant (see FIG. 5). An upper end 110 of the stem 106 has stem threads 112, and the operating stem nut 108 has corresponding nut threads 114, such that the nut threads 114 of the operating stem nut 108 can engage, or thread into, the stem threads 112 of the stem 106. The nut threads 114 can be internal to the operating stem nut 108, the stem threads 112 can be external to the stem 106, and the operating stem nut 108 can be at least partially inserted into the upper barrel 104 around the stem 106. Due to the threaded engagement between the operating stem nut 108 and the stem 106, rotation of the operating stem nut 108, without movement of the operating stem nut 108 in an axial direction of the upper barrel 104, results in linear movement of the stem 106 in the axial direction of the upper barrel 104.

Movement of the operating stem nut 108 in an axial direction can be limited in one direction by an internal step 116 in the upper barrel 104 and in the opposite direction by a lock nut 118. The upper barrel 104 can step to a larger diameter section, creating the internal step 116. The operating stem nut 108 can have a flange 120 that can abut the internal step 116, which can limit further insertion of the operating stem nut 108 into the upper barrel 104. The lock nut 118 can be inserted into the upper barrel 104 between the operating stem nut 108 and the larger diameter section of the upper barrel 104. Threads 122 on an outer circumference of the lock nut 118 can engage with (i.e., thread into) threads 124 on an inner circumference of the upper barrel 104 at a portion of the upper barrel 104 between the internal step 116 and an end face 126 of the upper barrel 104. The lock nut 118 can be screwed into the larger diameter section of the upper barrel 104 to lock the flange 120 between the lock nut 118 and the internal step 116.

The operating stem nut 108, as a result, can be rotated without movement along an axis 127 of the fire hydrant 100 (see FIG. 5), and via threaded engagement with the stem 106, can also move the stem 106 axially with respect to the upper barrel 104 to open or close the main valve 102 (see FIG. 5). The axis 127 is a center axis of the fire hydrant 100, the upper barrel 104, the stem 106, and the operating stem nut 108.

A spring element 128 can be configured to bias movement of the stem 106 axially toward the main valve 102 (see FIG. 5) relative to the operating stem nut 108. The spring element 128 can include spring washers, coil springs, or other presently known or future-developed springs or elastically deformable materials/structures that can perform the intended functions as described herein. As shown in FIG. 6, the spring element 128 (depicted as a set of spring washers) is inside a cavity or recess 130 in the upper end 110 of the stem 106. The cavity 130 terminates at a deep end 131, and the spring element 128 can abut the deep end 131 and extend axially away from the deep end 131 and couple to the upper barrel 104 directly or indirectly.

A stem lock screw 132, axially adjustable with respect to the operating stem nut 108, can be locked in position with respect to the operating stem nut 108, and can be inserted into the cavity 130 to engage the spring element 128. The spring element 128 can be compressed between the stem 106 and the stem lock screw 132, thereby biasing the stem 106 in an axial direction toward the main valve 102 (see FIG. 5). This force offsets or counteracts the water pressure effects against the main valve 102 (see FIG. 5) when the main valve 102 (see FIG. 5) is closed, reducing the torque necessary to turn the operating stem nut 108 and to move the main valve 102 (see FIG. 5) into an open position. The reduced torque facilitates easier opening of the main valve 102 (see FIG. 5) to allow water to enter the fire hydrant 100.

The stem lock screw 132 can include a stop flange 134 that can limit the axial movement of the stem 106 away from the main valve 102 (see FIG. 5), that can limit the distance the stem lock screw 132 extends into the cavity 130, and that can limit the compression of the spring element 128.

The stem lock screw 132 is axially adjustable with respect to the operating stem nut 108. Threads 136 on an outer circumference of the stem lock screw 132, between the stop flange 134 and an operator end 138, thread into threads 140 on an inner circumference of the operating stem nut 108. The operator end 138 includes a tool engaging element that a tool can engage to rotate the stem lock screw 132 into or out of the operating stem nut 108. As discussed above, the adjustable stem lock screw 132 can also be locked in position. In the embodiment of FIG. 6, a set screw 144 can be screwed into the operating stem nut 108 until it abuts the stem lock screw 132, or until it is positioned as desired to limit axial movement of the stem lock screw 132 out of the operating stem nut 108.

When the set screw 144 is in a position limiting rotation of the stem lock screw 132, then when the operating stem nut 108 is rotated, such as by a wrench 146 or other tool, the stem lock screw 132 rotates along with the operating stem nut 108, also without axial movement. The spring element 128 decompresses or compresses as the stem 106 moves axially toward or away from the main valve 102 (see FIG. 5). The bias of the spring element 128 assists moving the stem toward the main valve 102 to open the main valve 102 (see FIG. 5). When closing the main valve 102, the water pressure can be absent, or the water pressure can assist the movement of the main valve 102 (see FIG. 5) into the closed position. Any bias of the spring element 128 against closing the valve results in a lower torque requirement to close the valve than the conventional torque requirement to open the valve against the water pressure.

A cap 148 can cover the lock nut 118, to deflect moisture and dust. The cap 148 can be configured to screw onto the operating stem nut 108.

While a specific design for a fire hydrant 100 is shown in the figures and described with respect to the figures, other fire hydrant models that use a stem and operating stem nut to operate a main valve can use inventive concepts described herein.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A fire hydrant comprising:
    an upper barrel including a hollow section and having a center axis;
    a stem in the hollow section of the upper barrel, the stem having an upper end, a lower end, and threads, the upper end including a cavity;
    an operating stem nut having threads configured to threadingly engage the threads of the stem;
    a main valve coupled to the lower end of the stem, the stem configured to be moved along the center axis to move the main valve between an open position allowing fluid into the fire hydrant and a closed position preventing fluid from entering the fire hydrant; and
    a spring element in the cavity of the stem, the spring element coupled to the upper barrel, the spring element configured to bias the stem in a direction from the upper end of the stem toward the main valve.

2. The fire hydrant of claim 1, wherein:
    the upper barrel has an internal step from a first section with a first diameter to a second section with a second diameter, the second diameter larger than the first diameter;
    the operating stem nut has a flange configured to abut the internal step; and
    the fire hydrant further comprises a lock nut configured to be inserted into the hollow section of the upper barrel at the second section to lock the flange between the lock nut and the internal step.

3. The fire hydrant of claim 2, wherein:
    the second portion of the upper barrel has internal threads;
    the lock nut has external threads configured to thread into the threads of the second portion of the upper barrel; and
    an inner diameter of the lock nut is smaller than an outer diameter of the flange of the operating stem nut.

4. The fire hydrant of claim 1, further comprising a stem lock screw configured to insert into the cavity of the stem to engage the spring element.

5. The fire hydrant of claim 4, wherein the stem lock screw has a flange with a greater outer diameter than an outer diameter of the cavity, the flange configured to abut the stem and limit the insertion of the stem lock screw into the cavity.

6. The fire hydrant of claim 5, wherein:
    the fire hydrant further comprises a operating stem nut having a center hollow and internal threads;
    the stem lock screw includes a shaft with external threads; and
    the external threads of the stem lock screw are configured to thread into the internal threads of the operating stem nut.

7. The fire hydrant of claim 6, further comprising a set screw with external threads configured to screw into the internal threads of the operating stem nut to limit axial movement of the stem lock screw away from the stem.

8. A fire hydrant upper stem assembly comprising:
    a fire hydrant stem including an internal cavity;
    a stem lock screw configured to insert into the internal cavity of the fire hydrant stem to engage the spring element; and
    a spring element in the internal cavity.

9. The fire hydrant upper stem assembly of claim 8, wherein the internal cavity extends along an axis of the stem a length from an opening in an end of the stem, and the spring element is configured to compress and decompress along the axis of the stem and in the direction of the length.

10. The fire hydrant upper stem assembly of claim 8, wherein the fire hydrant further comprises an operating stem nut configured to engage the fire hydrant stem.

11. The fire hydrant upper stem assembly of claim 8, wherein the stem lock screw has a flange with a greater outer diameter than an outer diameter of the internal cavity, the flange configured to abut the stem and limit the insertion of the stem lock screw into the internal cavity.

12. The fire hydrant upper stem assembly of claim 11, further comprises a stem operating nut, the operating stem nut having a center hollow, the operating stem nut configured to engage the fire hydrant stem, and the operating stem nut configured to engage the stem lock screw.

13. The fire hydrant upper stem assembly of claim 12, further comprising a set screw configured to engage the operating stem nut and abut the stem lock screw to limit axial movement of the stem lock screw away from the stem.

14. A fire hydrant stem, comprising:
a shaft having a center axis, a first end portion, a first end, and a second end, the first end portion extending axially a length from the first end, the first end portion having external threads and including an internal cavity open through the first end, the second end configured to engage a fire hydrant main valve operating assembly; and
a spring element in the internal cavity.

15. The fire hydrant stem of claim 14, wherein the internal cavity terminates at a deep end, and wherein the spring element abuts the deep end and extends toward the opening through the first end of the shaft.

16. The fire hydrant stem of claim 14, wherein the first end portion of the stem is cylindrical.

17. The fire hydrant stem of claim 14, wherein the internal cavity is cylindrical.

18. A fire hydrant comprising:
an upper barrel including a hollow section and having a center axis;
a stem in the hollow section of the upper barrel, the stem having an upper end, a lower end, and threads, the upper end including a cavity;
an operating stem nut having threads configured to threadingly engage the threads of the stem;
a main valve coupled to the lower end of the stem, the stem configured to be moved along the center axis to move the main valve between an open position allowing fluid into the fire hydrant and a closed position preventing fluid from entering the fire hydrant;
a spring element in the cavity of the stem, the spring element coupled to the upper barrel, the spring element configured to bias the stem in a direction from the upper end of the stem toward the main valve; and
a stem lock screw configured to insert into the cavity of the stem to engage the spring element.

19. The fire hydrant of claim 18, wherein the stem lock screw has a flange with a greater outer diameter than an outer diameter of the cavity, the flange configured to abut the stem and limit the insertion of the stem lock screw into the cavity.

20. The fire hydrant of claim 19, wherein:
the fire hydrant further comprises a operating stem nut having a center hollow and internal threads;
the stem lock screw includes a shaft with external threads; and
the external threads of the stem lock screw are configured to thread into the internal threads of the operating stem nut.

21. The fire hydrant of claim 20, further comprising a set screw with external threads configured to screw into the internal threads of the operating stem nut to limit axial movement of the stem lock screw away from the stem.

22. A fire hydrant upper stem assembly comprising:
a fire hydrant stem including an internal cavity;
an operating stem nut configured to engage the fire hydrant stem; and
a spring element in the internal cavity.

* * * * *